United States Patent [19]
Okada

[11] Patent Number: 5,274,735
[45] Date of Patent: Dec. 28, 1993

[54] ELECTRIC SHAVER

[75] Inventor: Tetsuya Okada, Sumoto, Japan

[73] Assignee: Sanyo Electric Co., Ltd., Osaka, Japan

[21] Appl. No.: 808,431

[22] Filed: Dec. 16, 1991

[51] Int. Cl.$^5$ ............................................. G05B 1/10
[52] U.S. Cl. .................................. 388/815; 388/901; 388/907.5; 388/937
[58] Field of Search .......................... 388/809-815, 388/937, 901, 903-904, 910, 915-916, 917, 929, 937; 30/40, 42-46

[56] References Cited

U.S. PATENT DOCUMENTS 4,594,777 6/1987 Kimoto et al. ........................ 30/42
5,077,506 12/1991 Krause ........................... 388/815 X Primary Examiner—William M. Shoop, Jr.
Assistant Examiner—David Martin
Attorney, Agent, or Firm—Darby & Darby

[57] ABSTRACT

An electric shaver comprises: a current detecting circuit which detects load current of a motor; a microcomputer which samples the values detected by the current detecting circuit periodically to judge the size thereof, and the positive or negative results of the difference with the values sampled at last, to output a predetermined signal respectively responsive to the results; and a control circuit which controls the rotational speed of the motor according to the output signal from the microcomputer, whereby in the case where load current of the motor detected by the current detecting circuit is large, the microcomputer reckons that beards are thick, conversely, in the case where the load current is small, the microcomputer reckons that the beards are thin, thereby driving the motor at an optimum speed respectively.

6 Claims, 6 Drawing Sheets

ELECTRIC SHAVER

BACKGROUND OF THE INVENTION

1. Field of the Invention

The present invention relates to an electric shaver, more particularly, to control of a motor which is a core of its driving mechanism and detection of the load state thereof.

2. Description of the Related Art

In an electric shaver, by cooperative operations between an outer cutter which induces and leads in beards and an inner cutter which is driven by a motor, the beards induced by the outer cutter are cut.

With respect to control of a motor incorporated in such an electric shaver, for example, U.S. Pat. No. 4,594,777, Japanese Patent Application Laid-Open No. 62-79084 (1987) and so on are given as the prior arts.

In the former, a plurality of diodes are connected in series to a serial circuit of a battery and the motor, and by selecting how many diodes to be by-passed by mechanical switching means the applied voltage to the motor is adjusted to control the motor speed.

In the latter, the magnetic flux of the motor is detected by a Hall device, and the applied voltage to the motor is decided in response to the result of keeping the rotational speed of the motor at constant. This is for keeping the motor at its optimum rotational speed of 7000 r.p.m. such that the motor speed will not drop even in the case of thick beards.

However, since the motor is driven at constant speed for both a person having thick beards and a person having thin beards, the motor speed is so fast for the latter that the beards are not sufficiently induced into a cutter unit or twitches apt to occur. In the case where of the person having thick beards, since the motor is kept at constant speed during shaving, there is the possibility that, as same as stated above, the beards are not sufficiently induced or twitches may occur as the shaving proceeds. Thus, it is desirable to control the motor speed which is suitably responsive to thickness of the beards.

Meanwhile, refuses of the beards induced by the outer cutter and cut by the inner cutter are stuck to the inner cutter or dropped into a receptacle of the inner cutter and cumulated therein. Where the refuses are cumulated in the receptacle of the inner cutter, they are scattered to the outside or produce a bad smell and give an unpleasant feeling to the user. Moreover, by the refuses stuck to the inner cutter, whose, cutting performance is deteriorated or loads of the motor increase to damage the cutter, or the power consumption increases to deteriorate the battery life rapidly. Therefore, though it is desirable to clean the refuses by blushes or the like every time after shaving, it is very troublesome and annoying for the user, since, generally, the outer cutter must be removed from the body itself. When neglecting the cleaning of refuses, they are excessively cumulated to cause discomfort to the user as aforementioned.

SUMMARY OF THE INVENTION

The present invention has been devised in view of such circumstances. Therefore, it is a first object thereof to provide an electric shaver which automatically controls the motor speed responsive to the thickness of the beards.

A second object of the present invention is to provide an electric shaver which detects load current of the motor which is changing every second to control the motor speed automatically, even under the state wherein not only the thickness of the beards but also their grown condition or thickness thereof during shaving are not constant.

It is a third object of the present invention to provide an electric shaver which informs an appropriate cleaning timing of refuses to the user.

A first invention of the electric shaver of the present invention comprises: current detecting means for detecting the load current of a motor; operation means for periodically sampling the values detected by the current detecting means to judge sizes thereof, and judging positive and negative results of the difference with the values samples at last to output a predetermined signal respectively responsive to the results thereof; and control means for controlling the motor speed according to the output signal from the operation means.

In the first invention of the present invention, the above-mentioned judgement by the operation means is executed in accordance with a fuzzy rule.

In the first invention of the electric shaver of the present invention as stated above, in the case where the load current of the motor detected by the current detecting means is large, the operation means reckons that the beards are thick, and conversely, in the case where the load current is small the operation means reckons that the beards are thin, thereby the motor is driven at respective optimum speeds.

A second invention of the electric shaver of the present invention, in addition to the first invention, comprises: peak holding means having peak value storing means for holding a peak current value detected by the current detecting means; clearing means for clearing the peak value stored in the peak value storing means, and the switching means for switching on and off the input of the detected value of the current detecting means to the peak value storing means periodically at a predetermined interval.

In the second invention of the electric shaver of the present invention as stated above, since the peak value of load currents of the motor, which changes responsive to the states of beards changing momentarily during shaving, is held by the peak holding means at a predetermined duration, it is possible to control the optimum motor speed responsive to the states of beards.

Meanwhile, a third invention of the electric shaver of the present invention comprises, the start detecting means for detecting the start of the motor, whereby the control means drives the motor at a predetermined speed for a predetermined duration from the starting time of the motor, and the operation means compares the amount of load current of the motor during that duration with a predetermined value to allow display means to display a predetermined display responsive to the comparison result.

In the third invention of the electric shaver of the present invention as stated above, since the load current in the case where the motor is driven at a constant speed at starting the motor represents the cumulated amount of refuses, when the operation means judges that the amount of load current is larger than the predetermined value, it is displayed on the display means.

The above and further objects and features of the invention will be fully apparent from the flowing detailed description with accompanying drawings.

DESCRIPTION OF THE PREFERRED EMBODIMENTS

In the following, the present invention will be particularly described with reference to the drawings showing its embodiments.

Figure 1:
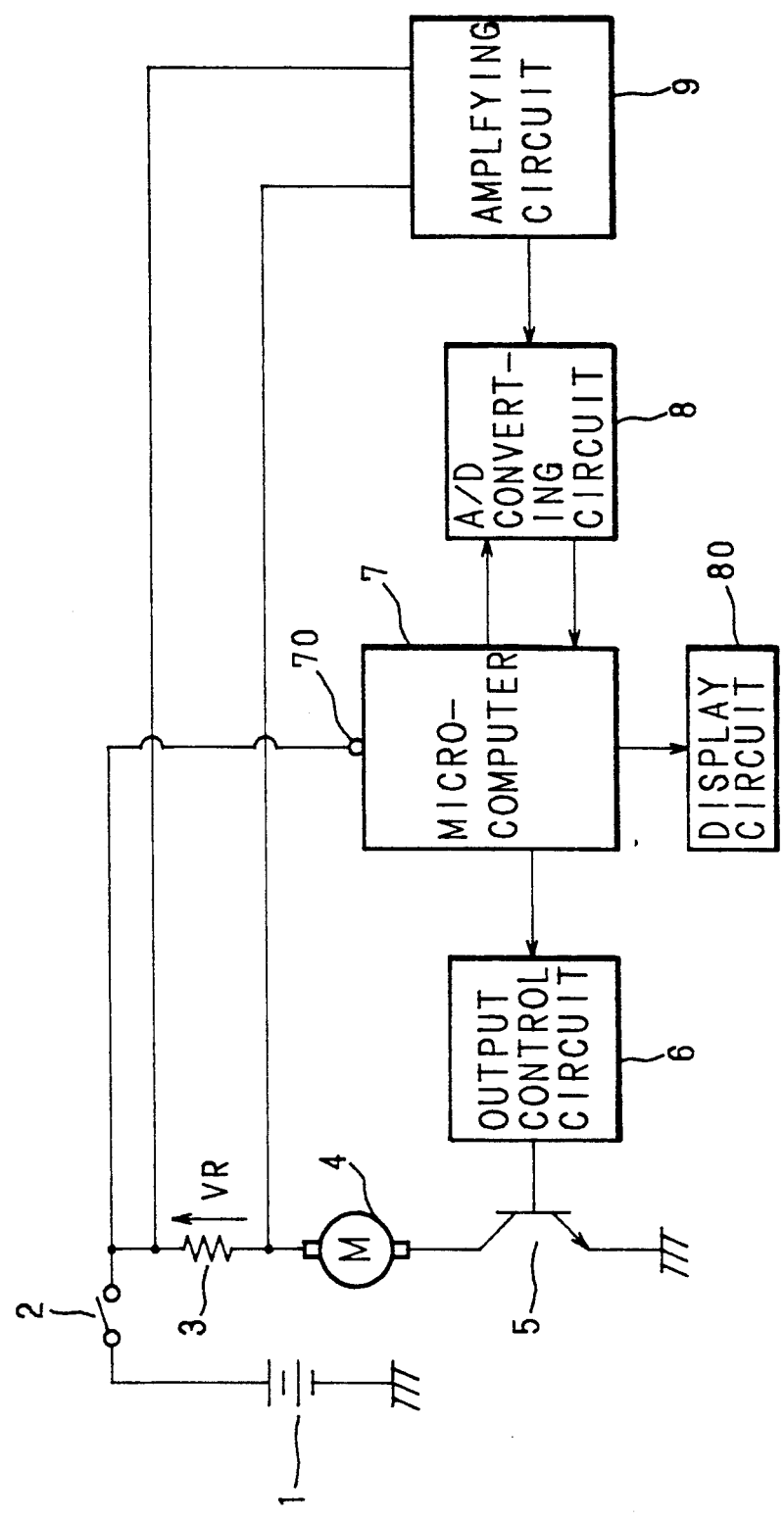
FIG. 1 is a block diagram showing a configuration of a control circuit of a motor of one embodiment of a first invention of an electric shaver of the present invention.

FIG. 1 is a block diagram showing a configuration of a control circuit of a motor of one embodiment of a first invention of an electric shaver of the present invention.

Figure 6:
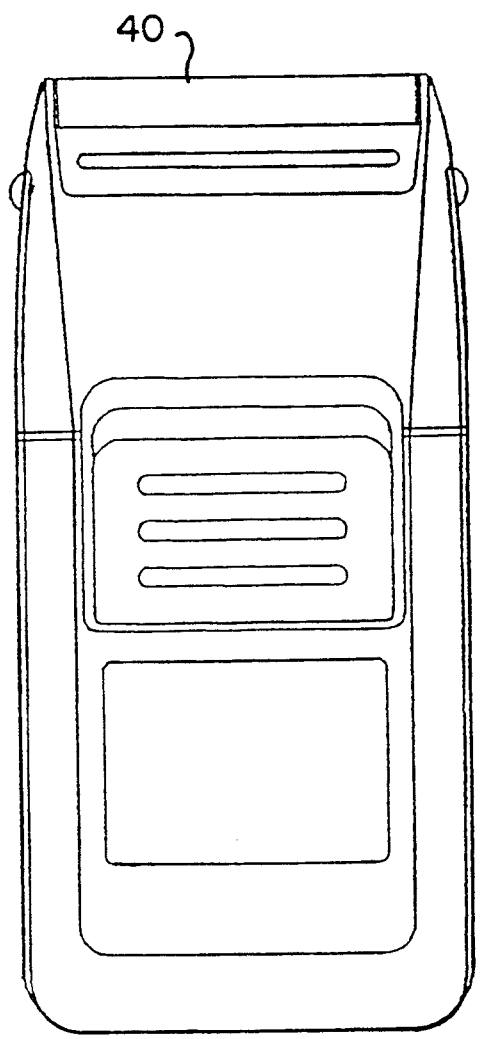
FIG. 6 is a front view of a typical electric shaver incorporating the invention.

FIG. 6 illustrates a typical electric shaver in which the present invention would be utilized. Such electric shavers are well known and, typically, include a cutting unit or head 40.

Inside a shaver itself, a chargeable battery 1, a motor (M) 4 and a main switch 2 for driving the motor 4 are connected in series. The battery 1 is a driving source of the electric shaver of the present invention. An output shaft of the motor 4 is connected to an inner cutter of a cutter unit not shown, and the inner cutter is urged by a spring so as to be pressed against an outer cutter, thereby cutting beards induced by the outer cutter.

Meanwhile, between the main switch 2 and the motor 4, a resistance 3 as current detecting means for detecting load currents of the motor 4 is disposed, and a main current path of a transistor 5 is disposed between the motor 4 and earth.

Also, an amplifying circuit 9 is connected to opposite ends of the resistance 3, and between the amplifying circuit 9 and a base terminal of the transistor 5 an A/D converting circuit 8, a microcomputer 7 as operation means and an output control circuit 6 as control means are connected in series.

A port 70 for detecting ON/OFF of the main switch 2 is provided in the microcomputer 7. Since a signal of low level is applied to the port 70 when the main switch 2 is in the off state, and a signal of high level is applied when the main switch 2 is in the on state, in the case where the main switch 2 is turned on it is immediately detected by the microcomputer 7. Reference numeral 80 designates a display circuit as display means, which is controlled by the microcomputer 7 for various displays.

The first invention of the electric shaver of the present invention including a control circuit thus constituted operates as follows.

When the main switch 2 is turned on, since the input signal level to the port 70 of the microcomputer 7 changes, the microcomputer 7 immediately detects that the main switch 2 is on, and gives a predetermined signal to the output control circuit 6. Thereby, the output control circuit 7 supplies base current to the transistor 5 to make it conductive. As a result, the motor 4 is rotated to drive the inner cutter of the cutter unit (not shown), thereby cutting the beards when the cutter unit is pressed against the beards. At this time, load current flows through the resistance 3 for detecting current to generate the voltage VR at opposite ends thereof. During shaving, since the load current varies in proportion to the amount of beards, the voltage VR also varies in response to the amount of beards.

Now, the voltage VR is converted into a digital value by the A/D converting circuit 8 and outputted, after being amplified by the amplifying circuit 9. Meanwhile, the microcomputer 7 samples and takes in the digital value outputted from the A/D converting circuit 8 periodically. The microcomputer 7 is constituted so as to perform fuzzy control according to fuzzy-rule tables as shown in Tables 1, 2 and 3. Relationships between the measured value of load current and the rotational speed of the motor 4 are set beforehand.

The microcomputer 7 decides optimum rotational speed of the motor 4 according to the measure value I of load current at the present sampling time, and a difference ΔI between the measured value I and the measured value of load current at the last sampling time, and outputs a predetermined signal indicating the optimum rotational speed of the motor 4 to the output control circuit 6. In the output control circuit 6, by receiving the signal applied from the microcomputer 7 the conductive state of the transistor 5 is controlled. As a result, the optimum rotational speed of the motor 4 is obtained responsive to the thickness of beards.

Hereupon, a fuzzy inference based on the fuzzy-rule table will be explained.

The microcomputer 7 compares the measured value I of load current by the resistance 3 with a reference value set beforehand. As a result, in the case where the measured value I is larger relative to the reference value, the difference is judged within a range of attributes 0 to 1. The attribute in the case where the measured value I is sufficiently larger relative to the reference value is 1. Similarly, a set of cases where the measured value I is generally equal to the reference value is judged within a range of attributes 0 to 1. It is also judged within a range of attributes 0 to 1 in the case where the measured value I is smaller than the reference value.

Meanwhile, the microcomputer 7 judges a set of cases where the difference ΔI between the measured value I of the present sampling time and that of the last sampling time negative, zero and positive within a range of attributes 0 to 1. For example, in Table 1, when the measured value I is larger relative to the reference value and its attribute is 1, and the difference ΔI with the measured value at last sampling time is positive and its attribute is 1, the microcomputer 7 outputs the P (positive) signal according to the fuzzy-rule table. The signal P is an instruction to raise the rotational speed of the motor 4 by 300 r.p.m. As such, in the fuzzy-rule tables, instructions in the cases where the respective attributes are 1 are set beforehand.

Tables 1, 2 and 3 are fuzzy-rule tables in which rules are set respectively responsive to the rotational speeds of the motor 4. Table 1 shows the fuzzy rule in the case where the rotational speed of the motor 4 is 7,200 r.p.m. or more.

TABLE 1

| I/ΔI | Negative | Zero | Positive |
|---|---|---|---|
| large | Z | Z | N |

TABLE 1-continued

| I/ΔI | Negative | Zero | Positive |
|---|---|---|---|
| medium | Z | N | P |
| small | N | NB | Z |

Table 2 shows the fuzzy rule in the case where the rotational speed of the motor 4 is 6,500 r.p.m. or more and below 7,200 r.p.m.

TABLE 2

| I/ΔI | Negative | Zero | Positive |
|---|---|---|---|
| large | Z | Z | PB |
| medium | Z | Z | P |
| small | Z | N | Z |

Table 3 shows the fuzzy rule in the case where the rotational speed of the motor 4 is below 6,500 r.p.m.

TABLE 3

| I/ΔI | Negative | Zero | Positive |
|---|---|---|---|
| large | Z | PB | PB |
| medium | Z | Z | PB |
| small | N | N | Z |

Signals used in Tables 1, 2 and 3 have following meanings.

PB (positive big): raise the rotational speed of the motor 4 by 600 r.p.m.

P (positive): raise the rotational speed of the motor 4 by 300 r.p.m.

Z (negative): keep the rotational speed of the motor 4 at that time point

N (negative big): reduce the rotational speed of the motor 4 by 50 r.p.m.

NB (negative big): reduce the rotational speed of the motor 4 by 150 r.p.m.

Now, in the microcomputer 7, responsive to the attribute of extent of the measured value I of load current, or the attribute of difference ΔI with the measured value at last sampling time, the fuzzy inference is employed for judging the fluctuation range of the rotational speed of the motor 4. That is, the microcomputer 7 decides the fluctuation range of the rotational speed of the motor 4 finely, by judging that to what extent the rotational speed of the motor 4 coincides to the cases where attribute is 1, and reflecting a degree of coincidence to the output signal.

Though variations in the case where of reducing the rotational speed of the motor 4 are made smaller than variations in the case where of raising the rotational speed of the motor 4, it is for preventing the user from misconceiving that, a sudden drop of the rotational speed of the motor 4 due to sudden decrease of beards after shaving is caused by the sudden deterioration of the capacity of the battery 1 or malfunction of the driving circuit.

As stated heretofore, in the first invention of the electric shaver of the present invention, in the case where the load current detected by the resistance 3 as current detecting means is large, the microcomputer 7 as operation means reckons that the beards are thick, conversely, in the case where the load current is small the microcomputer 7 reckons that the beards are thin, and automatically controls the rotational speed of the motor 4 to become optimum responsive to the responsive thicknesses of the beards. Consequently, in the case where the beards are thin, inconveniences such as deterioration of induction of beards into the cutter unit or occurrence of twitch after shaving are prevented. Also, since the rotational speed of the motor 4 is reduced in the case where the beards are thin, useless consumptions of the battery 1 can be prevented and its service time can be prolonged.

Next, the second invention of the electric shaver of the present invention will be explained.

Figure 2:
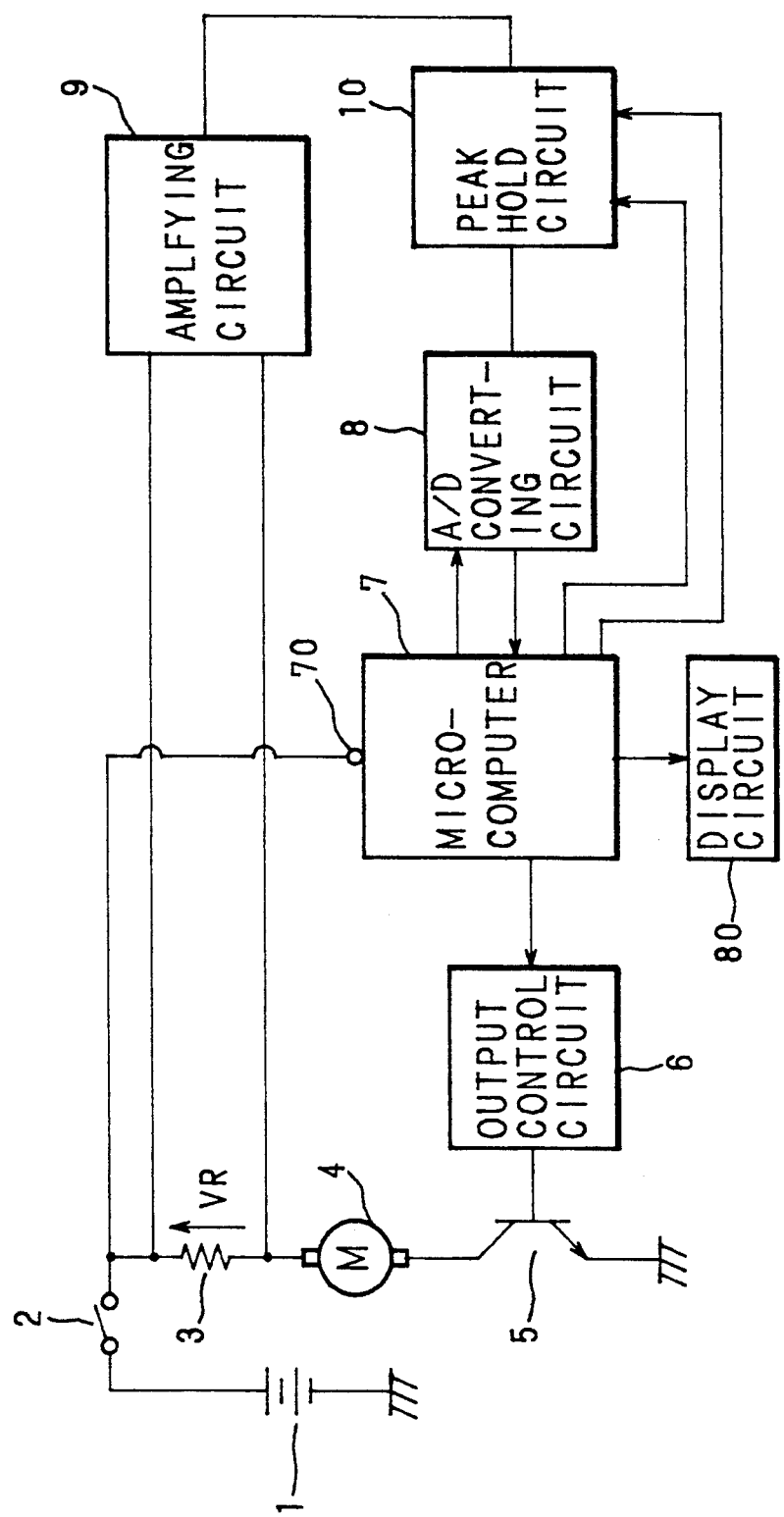
FIG. 2 is a block diagram showing a configuration of a control circuit of a motor of one embodiment of a second invention of an electric shaver of the present invention.

FIG. 2 is a block diagram showing a configuration of a control circuit of a motor in one embodiment of the second invention of the electric shaver of the present invention.

It is same as the first invention shown in the aforementioned block diagram of FIG. 1, that a battery 1, a main switch 2, a resistance 3, a motor 4, a transistor 5, an output control circuit 6, a microcomputer 7, an A/D converting circuit 8 and further a display circuit 80 are included in FIG. 2. In the second invention, however, as shown in FIG. 2, between the amplifying circuit 9 and the A/D converting circuit 8, a peak holding circuit 10 is provided as peak holding means to hold a peak output value from the amplifying circuit 9.

Figure 3:
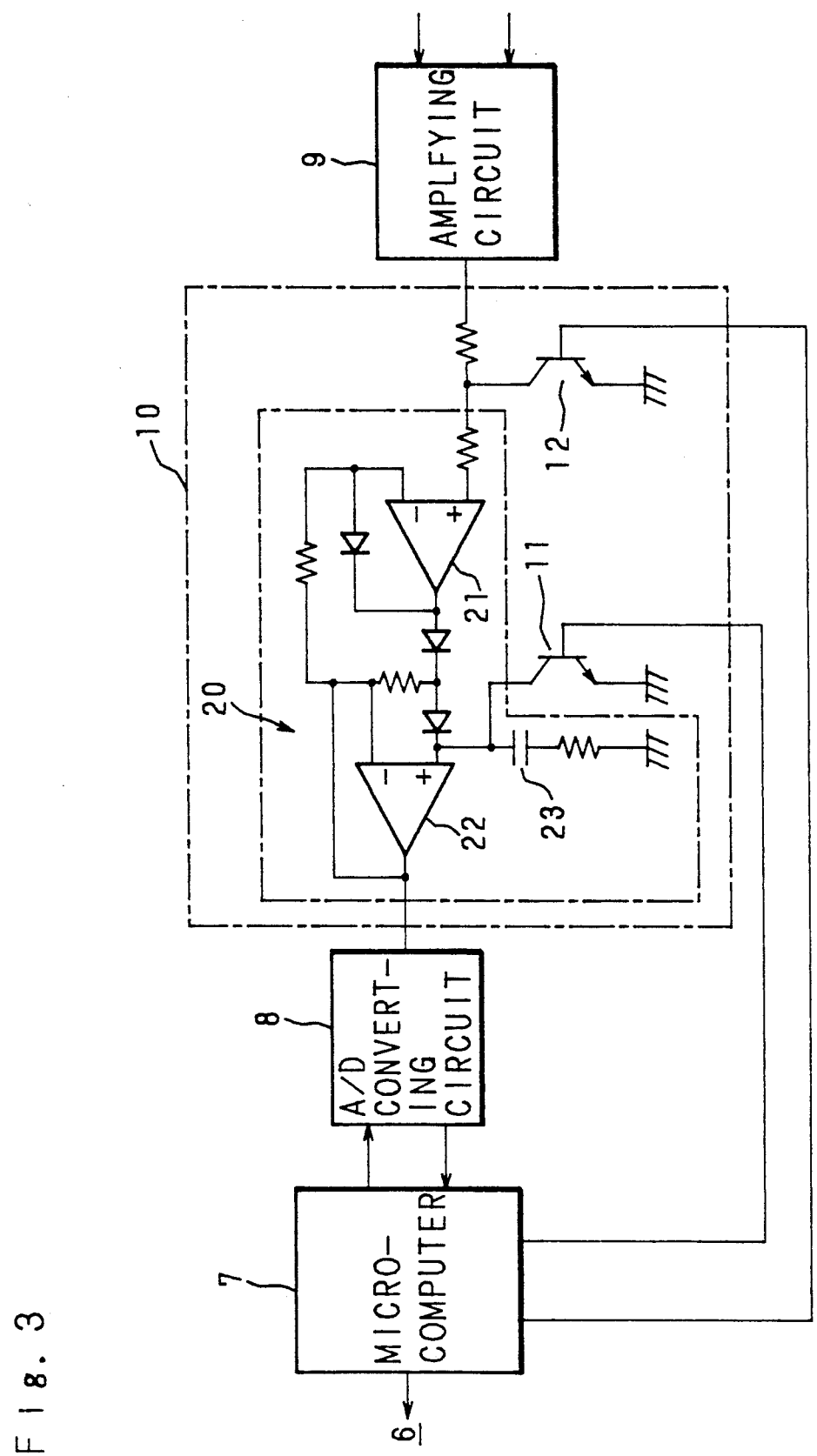
FIG. 3 is a circuit diagram showing a detailed configuration of its peak holding circuit.

FIG. 3 is a circuit diagram showing a detailed of the peak holding circuit 10.

The peak holding circuit 10 is constituted of a peak value storing circuit 20, a first switching transistor 11 as clearing means, and a second switching transistor 12 as switching means. The peak value storing circuit 20 is constituted of two operational amplifiers 21, 22 and a peak holding capacitor 23.

Output of the amplifying circuit 9 is connected to a collector of the second switching transistor 12 and a plus side input terminal of the operational amplifier 21. An emitter of the second switching transistor 12 is earthed and a base thereof is connected to a microcomputer 7. An output terminal of the operational amplifier 21 is connected to a collector of the first switching transistor 11 and an input terminal of the operational amplifier 22, and further to one end of the peak-holding capacitor 23. An emitter of the first switching transistor 11 is earthed and a base thereof is connected to the microcomputer 7. The other end of the peak holding capacitor 23 is earthed.

Accordingly, electric charges accumulated in the peak holding capacitor 23 are discharged when the first switching transistor 11 is in the conductive state. A base terminal of the first switching transistor 11 is connected to the microcomputer 7, from which a predetermined signal is outputted periodically and applied to the base terminal of the first switching transistor 11, thereby the first switching transistor 11 is switched on and off periodically. Also, A base terminal of the second switching transistor 12 is connected to the microcomputer 7, from which a predetermined signal is outputted periodically and applied to the base terminal of the second switching transistor 12, thereby the second switching transistor 12 is also switched on and off periodically.

The operation of the second invention of the electric shaver of the present invention having a control circuit thus constituted will be explained in the following with reference to waveform diagrams of FIG. 4.

When the main switch 2 is turned on, as same as the first invention stated previously, the microcomputer 7 detects that the main switch 2 is turned on, and applies a predetermined signal to the output control circuit 6. Thereby, the output control circuit 6 supplies base current to the transistor 5 to make it conductive. As a result, the motor 4 is rotated to drive the inner cutter of the cutter unit (not shown), thereby cutting the beards when the cutter unit is pressed against the beards. At this time, load current flows through the resistance 3 for detecting current to generate the voltage VR at opposite ends thereof. During shaving, since the load current varies in proportion to the amount of beards, the voltage VR also varies responsive to the amount of beards. The voltage is amplified by the amplifying circuit 9 and inputted to the peak hold circuit 10.

Figure 4A:
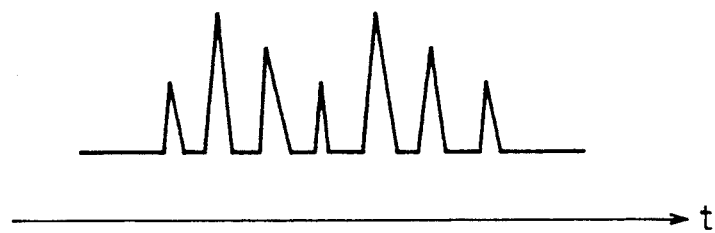
FIGS. 4(a), 4(b), 4(c), and 4(d) are waveform diagrams for explaining its operation.
Figure 4B:
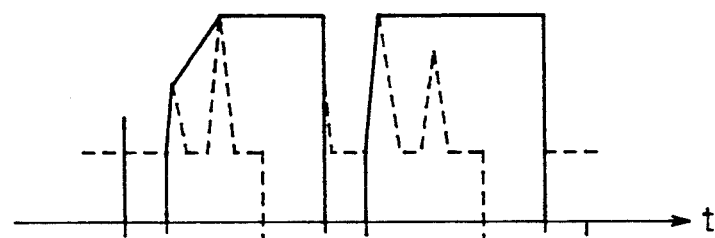
Figure 4C:
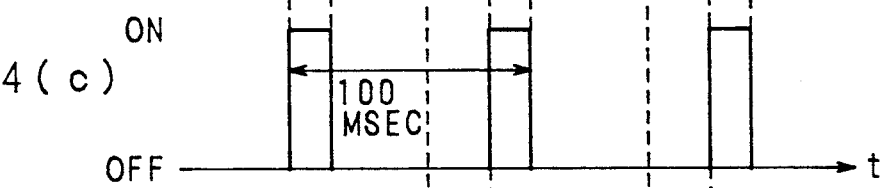

A signal waveform inputted to the peak hold circuit 10 is shown in FIG. 4(a). A number of peak voltages shown here indicate the amount of beards by the number of peaks (density) per time and the hardness of beards by the height of peaks. The peak signal has its maximum value stored and updated by the peak holding capacitor 23. Since the first switching transistor 11 is switched on and off repeatedly at a duration of 100 m sec as shown in FIG. 4(c), electric charges accumulated in the peak holding capacitor 23 are discharged through a main current path of the first switching transistor 11 during it is on, and a hold value of the peak value storing circuit 20 is cleared. And, during the first switching transistor 11 is off next, the electric charges are accumulated again in the peak holding capacitor 23 and the maximum value of the peak signal is stored and updated.

Figure 4D:
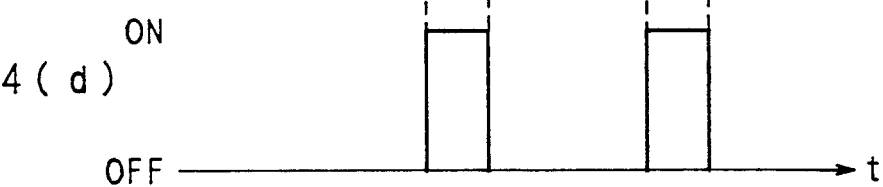

Meanwhile, the second switching transistor 12 is on for a predetermined time during the first switching transistor 11 is off as shown in FIG. 4(d). Thus, since the peak signal is by-passed to the main current path of the second switching transistor 12 during this duration, the peak signal is not inputted to the peak value storing circuit 20. Consequently, the maximum value, a value at the time point when the second switching transistor 12 is off, stored in the peak holding capacitor 23 is held as it is during the second switching transistor 12 is off as shown in FIG. 4(b).

The maximum value of peak signal held at constant during the second switching transistor 12 is off is converted into a digital value by the A/D converting circuit 8 and inputted to the microcomputer 7. The microcomputer 7 operates the digital value to judge the shaving state, then decides the optimum rotational speed of the motor 4 and outputs a predetermined signal corresponding thereto. By the output signal from the microcomputer 7, the output control circuit 6 and the transistor 5 control the rotational speed of the motor 4.

As stated above, in the second invention of the present invention, since the peak hold circuit 10 as the peak hold means holds the peak output value of the resistance 3 as the current detecting means, and the first switching transistor 11 as clearing means clears and updates the held value periodically at a predetermined interval, moreover the second switching transistor 12 as switching means holds the peak value at constant for a predetermined duration, during which the microcomputer 7 as the operation means can read the peak value. Thus, since load current of the motor 4 can be measured accurately, it is possible for the microcomputer 7 to judge the shaving state from the measured value of load current. As a result, the rotational speed of the motor 4 can be controlled most suitably responsive to the shaving state.

Next, the third invention of the electric shaver of the present invention will be explained.

Figure 5:
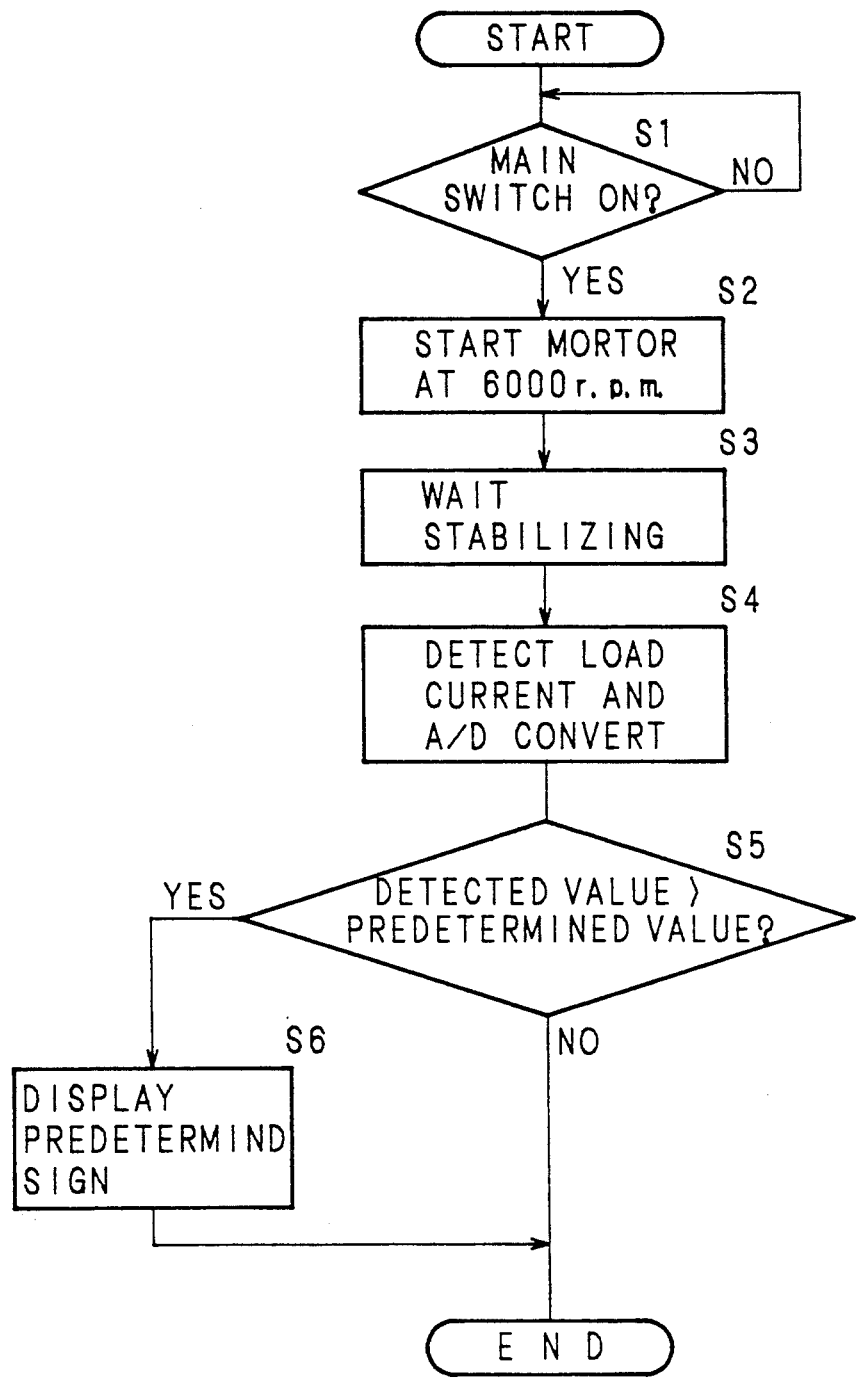
FIG. 5 is a flow chart showing controlling procedures of a microcomputer of a third invention.

The third invention may be realized by control of the microcomputer 7 using the control circuits of the aforementioned first and second inventions. FIG. 5 is a flow chart showing control procedures of the microcomputer 7.

When the main switch 2 is turned on, since the input signal state to the port 70 is changed, the microcomputer 7 detects it immediately (Step S1). The microcomputer 7 responsive to the main switch 2 which is turned on, applies a predetermined signal to the output control circuit 6 to make the transistor 5 conductive. Thereby, the motor 5 is started, but the rotational speed of the motor 4 at this case is kept at 6,000 r.p.m. (Step S2). Then, the current detecting resistance 3 detects load current of the motor 4. The detected load current value, after being held in the peak hold circuit 10 or converted into a digital value directly by the A/D converting circuit 8 (Step S4), read in the microcomputer 7. However, during several tens to several hundreds millisecond. Until the rotational speed of the motor 4 is stabilized at 6,000 r.p.m., the microcomputer 7 delays to read the digital value outputted from the A/D converting circuit 8 (Step S3).

The microcomputer 7, after the rotational speed of the motor 4 has stabilized, reads the digital value outputted from the A/D converting circuit 8, and compares with a predetermined value set beforehand (Step S5). As a result of comparison in Step S5, when the detected load current value is larger than the predetermined value, the microcomputer 7 judges that the cumulated amount of refuses is increasing and outputs a predetermined signal to the display circuit 80. In the display circuit 80, responsive to the predetermined signal applied from the microcomputer 7, a predetermined display for demanding cleaning of the refuses to the user is displayed (Step S6).

Thereafter, the same operation as the first invention shown in FIG. 1 or the second invention shown in FIG. 2 is performed.

In addition, using state of the electric shaver, in most cases the user starts shaving by pressing the cutter unit of the electric shaver against his skin after turning on the main switch 2, and there is little possibility that the cutter unit of the electric shaver is pressed onto the user's skin immediately after start of the motor 4. Therefore, by keeping the rotational speed of the motor 4 at constant as aforementioned immediately after the main switch 2 is on, the load current value detected by the current detecting resistance 3 during when may be reckoned as the cumulated amount of refuses. Thus, the microcomputer 7 is restricted to read the load current value from the A/D converting circuit 8 immediately after start of the motor 4, and the cumulated amount of refuses detected then is the amount of the time point when the user has finished using the electric shaver before.

As particularly described above, in the third invention of the present invention, the microcomputer 7 as the operation means detects the load current value of the motor 4 immediately after the start to compare with a predetermined value, and judges that the refuses are cumulated when the detected value is larger and allows the display circuit 80 as the display means to display a predetermined display. Therefore, since the user is informed about the timing when the refuses are to be cleaned, such a misconduct as wasting the battery 1 uselessly without knowing that the refuses are cumulated considerably can be avoided.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within meets and bounds of the claims, or equivalence of such meets and bounds thereof are therefore intended to be embraced by the claims.

What is claimed is:

1. An electric shaver, comprising:
   a motor;
   a cutter unit driven by said motor;
   current detecting means for detecting load current of said motor;
   operation means, having:
   sampling means for sampling the detected values of said current detecting means periodically at a predetermined interval;
   first judging means for judging whether the value at each of the sampling time by said sampling means is larger or not than a predetermined value;
   second judging means for judging positive or negative results of the difference between the respective values at each of the sampling time and the values at the last sampling time by said sampling means; and
   output operation means for outputting a predetermined signal which is previously determined responsive to each judged results by said both judging means respectively; and
   control means for controlling the rotational speed of said motor responsive to outputs of said operation means.

2. An electric shaver as set forth in claim 1, wherein said operation means performs each said judgment by a fuzzy inference.

3. An electric shaver, comprising:
   a motor;
   a cutter unit driven by said motor;
   current detecting means for detecting load current of said motor;
   peak hold means, having:
   peak value storing means for storing a peak value of the detected values of said current detecting means;
   clearing means for clearing the peak value stored in said peak value storing means periodically at a predetermined interval; and
   switching means for switching on and off input of the detected value of said current detecting means to said peak value storing means periodically at a predetermined interval;
   operation means for reading the peak value stored in said peak value storing means and outputting a predetermined signal responsive to the read value, during the input signal to said peak value storing means is off; and
   control means for controlling the rotational speed of said motor responsive to the output of said operation means.

4. An electric shaver, comprising:
   a motor;
   a cutter unit driven by said motor;
   start detecting means for detecting the start of said motor;
   current detecting means for detecting load current of said motor;
   operation means, having:
   sampling means for sampling the detected values of said current detecting means periodically at a predetermined interval;
   first judging means for judging whether the value at each of the sampling time by said sampling means is larger or not than a predetermined value;
   second judging means for judging positive or negative results of the difference between the respective values at each of the sampling time and the values at the last sampling time by said sampling means; and
   output operation means for outputting a predetermined signal which is previously determined responsive to each judged results by said both judging means respectively; and
   control means for controlling the rotational speed of said motor responsive to outputs of said operation means, and keeping the rotational speed of said motor immediately after start at constant, during a predetermined duration from the time point when said start detecting means has detected the start of said motor; and
   display means for displaying a predetermined display responsive to control of said operation means;
   whereby said operation means compares the detected value of said current detecting means and a predetermined value during the predetermined duration, and displays predetermined display on said display means responsive to the comparison result.

5. An electric shaver as set forth in claim 4, wherein said operation means performs each said judgment by a fuzzy inference at a respective sampling time of the detected values of said current detecting means.

6. An electric shaver, comprising:
   a motor;
   a cutter unit driven by said motor;
   start detecting means for detecting the start of said motor;
   current detecting means for detecting load current of said motor;
   peak hold means, having:
   peak value storing means for storing a peak value of the detected values of said current detecting means;
   clearing means for clearing the peak value stored in said peak value storing means periodically at a predetermined interval; and
   switching means for switching on and off inputs of the detected values of said current detecting means to said peak value storing means periodically at a predetermined interval;
   operation means for reading the peak value stored in said peak value storing means and outputting a predetermined signal responsive to the read value, in the case where the input signal to said peak hold means is off;
   control means for controlling the rotational speed of said motor responsive to outputs of said operation means, and keeping the rotational speed of said motor at constant immediately after start, during a predetermined duration from the time point when said start detecting means has detected the start of said motor; and
   display means for displaying a predetermined display responsive to control of said operation means;
   whereby said operation means compares the detected value of said current detecting means with a predetermined value during said predetermined duration, and displays a predetermined display on said display means responsive to the comparison result.

* * * * *